United States Patent [19]

Trexler, Jr. et al.

[11] 4,084,276
[45] Apr. 18, 1978

[54] SWING-AWAY BUNK

[75] Inventors: Ray W. Trexler, Jr., Federal Way; Donald J. Teodoro, Seattle, both of Wash.

[73] Assignee: PACCAR Inc., Bellevue, Wash.

[21] Appl. No.: 735,090

[22] Filed: Oct. 22, 1976

[51] Int. Cl.² .............................................. A47K 11/02
[52] U.S. Cl. ................................................ 5/118; 5/8; 5/9 R
[58] Field of Search ................... 5/8, 9 R, 9 B, 118

[56] References Cited

U.S. PATENT DOCUMENTS 1,945,875  2/1934  Weller ...................................... 5/9 R
3,829,912  8/1974  Quakenbrush ........................ 5/118

Primary Examiner—Peter M. Caun
Attorney, Agent, or Firm—Seed, Berry, Vernon & Baynham

[57] ABSTRACT

A swing-away bunk is provided with a frame assembly having a mattress affixed thereto. The frame asssembly is suspended on a pair of pivotal sets of links which allow the mattress to swing against the rear wall of a truck cab in a vertical storage position and be pulled forward and upwardly into a horizontal position. Cam surfaces guide the rear end of the frame assembly forwardly and upwardly passed a rear support when the bunk is pulled into its horizontal position.

6 Claims, 4 Drawing Figures

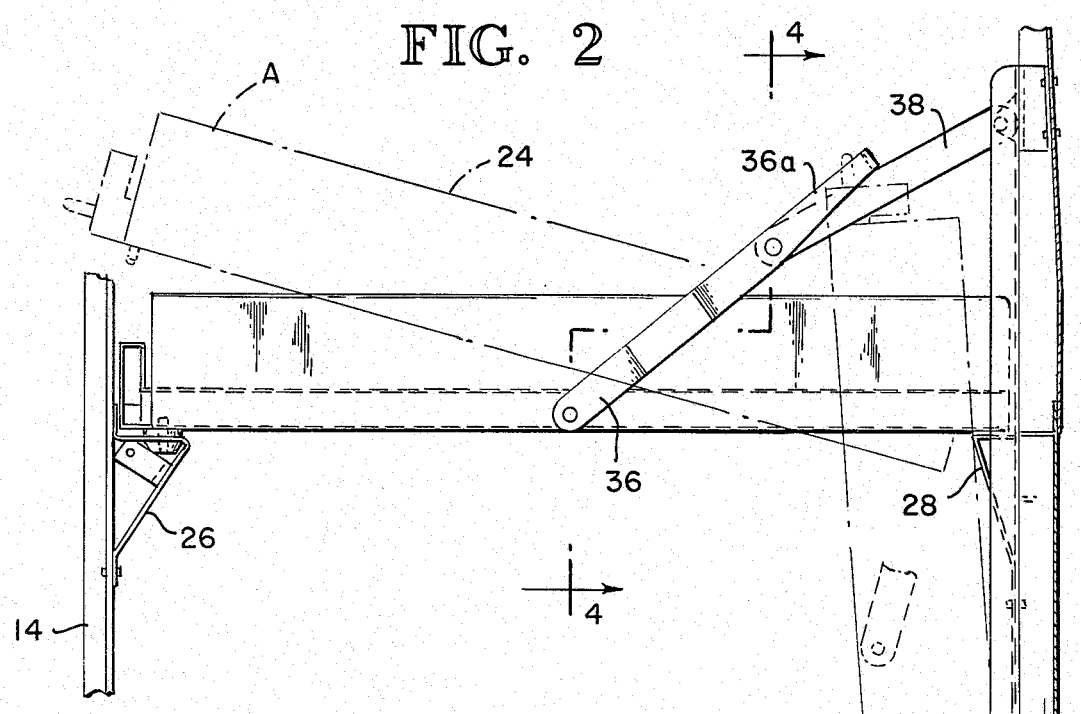
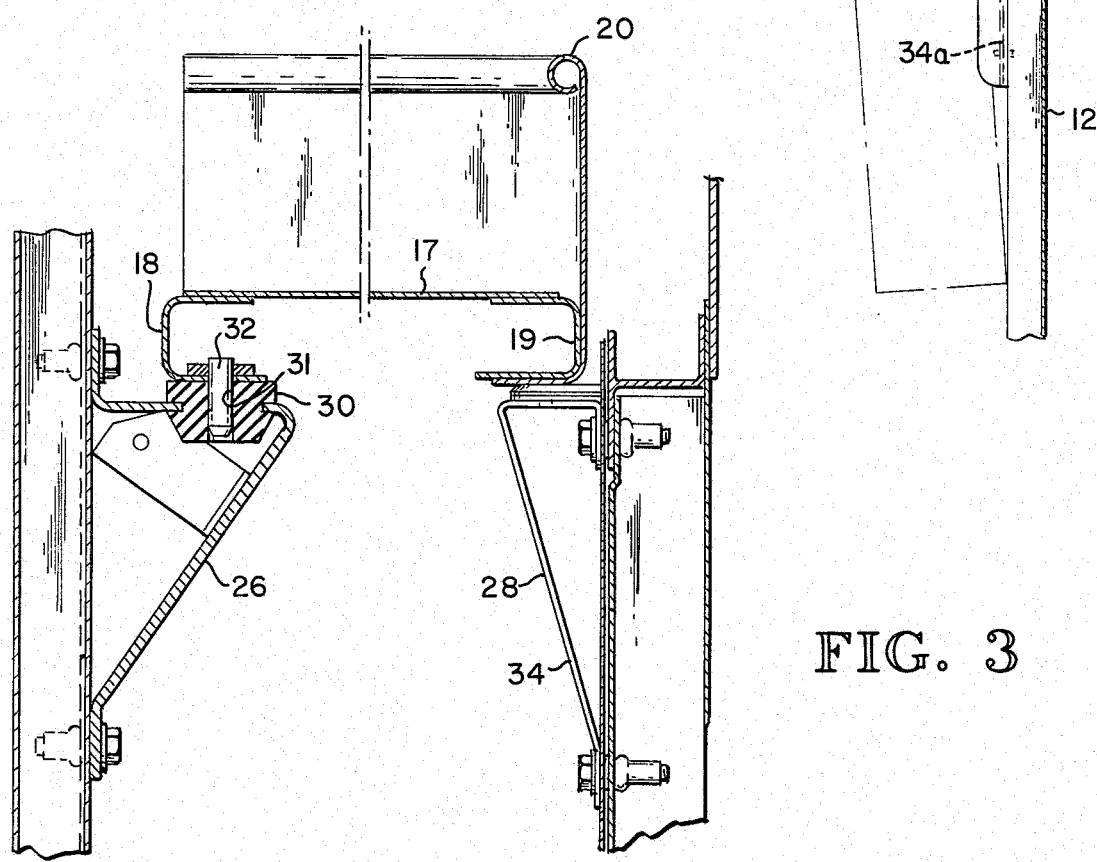

SWING-AWAY BUNK

BACKGROUND OF THE INVENTION

Field of the Invention

This invention pertains to storable bunks in automotive truck cabs.

SUMMARY OF THE INVENTION

Modern truck cabs are occasionally provided with two bunks. It is necessary to provide an upper bunk, therefore, which is easily pulled from a rearward storage position into the horizontal occupant position and yet is clearly out of the way of the driver or his assistnat when not in the horizontal position.

It is an object of this invention, therefore, to provide a swing-away bunk which stores flat against the vertical rear wall of a truck cab.

It is another object of this invention to provide a swing-away bunk which is easily moved from a vertical storage position into a horizontal position by a single person.

It is still another object of this invention to provide a swing-away bunk which is easy to store and safe to be occupied.

Basically, these objects are obtained by swingably mounting a frame assembly to the rear wall of a cab in such a manner that it will pivot and swing downwardly into a vertical position tight against the rear wall of the cab and yet with an upward pull, can be swung forwardly into a horizontal position where it is supported front and rear. In the preferred embodiment, cam surfaces are provided to guide the rear portion of the frame assembly forwardly and upwardly to clear rear support brackets so that a sharp, forward pull on the bunk from its vertical storage position will provide momentum to make the bunk clear the rear support brackets and then swing by gravity on pivotal links back down into a secured, horizontal position.

BRIEF DESCRIPTION OF THE FIGURES OF THE DRAWING

FIG. 2 is a vertical section of the truck cab shown in FIG. 1.

FIG. 3 is a fragmentary, enlarged vertical section of the bunk.

DETAILED DESCRIPTION OF THE PREFERRED EMBODIMENTS

Figure 1:
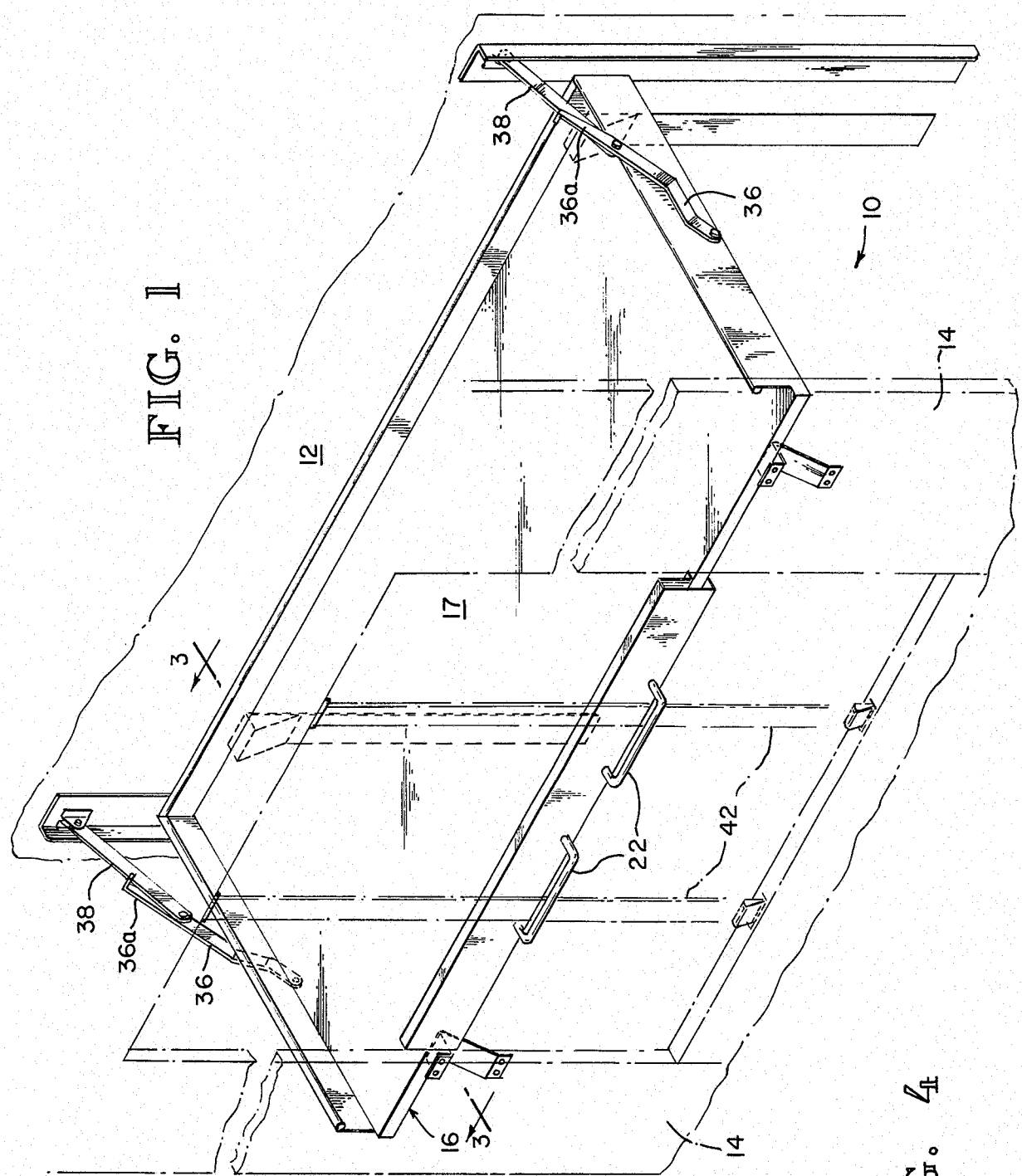
FIG. 1 is a fragmentary isometric of a truck cab illustrating a bunk made according to the principles of the invention.
Figure 4:
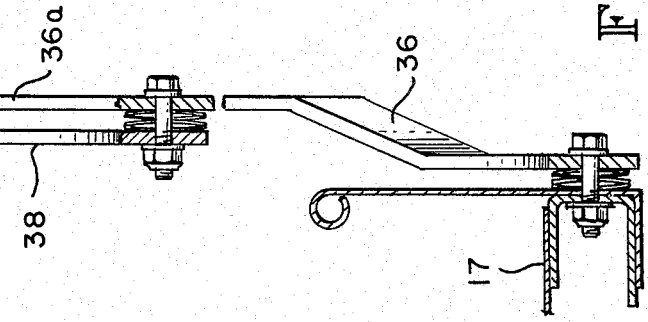
FIG. 4 is an enlarged, fragmentary front elevation of one of the pivotal links supporting the bunk.

A truck cab is provided with a rear sleeping compartment 10 and includes a rear wall 12 and forward, vertical support members 14. A frame assembly 16 includes a flat metal plate 17, a forward frame member 18 (FIG. 3) and a rearward frame member 19. The rearward frame member is provided with a rolled edge or cam follower 20 to be described. The forward frame member is provided with a pair of tubular handles 22. A conventional foam mattress 24 is securely retained to the plate 17.

In the horizontal position, the frame assembly is carried by two forward supports 26 and two rearward supports 28. Each forward support is provided with a resilient grommet 30 having an aperture 31 which receives a tapered pin 32 attached to the forward frame member 18 of the frame assembly. The tapered pins seat and are held by friction within the grommets serving to cushion the impact of the bunk when it is placed in a horizontal position and preventing lateral movement when the bunk is occupied.

The rear supports 28 each have a cam surface 34 which has an extension 34a along the rear wall of the cab. Cam surface 34 guides the rolled edge 20 of the rear frame member 19 during downward or upward movement of the bunk. The cam surface is forwardly and upwardly directed so that by pulling sharply forwardly on the bunk when in the vertical position, the bunk will swing forward and the rear surface will slide over the cam surface 34 with the momentum of the bunk moving the rear frame member 19 past the upper surface of the support member 28. The weight of the bunk will then cause the bunk to swing downwardly and rearwardly into a seated position on the rear support members 28.

In order to cause pivotal movement of the bunk, the bunk is provided with lower, pivotal links 36 which are pivotally connected to the frame assembly on opposite ends of the bunk and to upper links 38 which are pivotally connected to the rear wall of the cab at points spaced vertically above the vertical supports 28. The lower links are each provided with an extension 36a that stops over-center movement of the center pivot between the links. The links connect to the bunk just forward of the fore and aft midpoint so that the bunk rear end will naturally swing down first into the suspended vertical position as shown in phantom lines in FIG. 2. As the bunk is pulled sharply into the horizontal position, the bunks will swing about the pivot arm formed by the links 36 and 38 causing the bunk to first reach an elevation slightly higher than position A shown in FIG. 2 in phantom lines and then falling back as it swings further about the links 36 and 38 into the seated position shown in solid lines in FIG. 2. This combined pivoting and sliding on the cam surfaces 34 facilitates bringing the bunk from its vertical storage position into the horizontal position and makes a convenient operation for one person. Similarly, to return the bunk to the storage position the person need only to grasp the handles and pulling sharply upwardly and forwardly until the rearward end of the frame assembly swings clockwise (FIG. 2) about the links 36 and 38 clear of rear supports 28 and then downwardly onto the cam surfaces 34 where the weight of the bunk will then return the bunk to its vertical position.

In the preferred embodiment, retractable belts or safety straps 42 are provided and uniquely pass through the handles 22 when the bunk is in a horizontal position. The belts are retracted conventionally from above and below and are releasably secured for occupant restraint at about their midpoints. The use of the handles for the dual purpose of the belt restraint and pulling handles uniquely assures that a single belt can serve both the bottom occupant and the upper occupant of the sleeping compartment without the need for separate restraint belts for each.

While the preferred embodiments of the invention have been illustrated and described it should be understood that variations will be apparent to one skilled in the art without departing from the principles expressed herein. Accordingly, the invention is not to be limited to the specific form illustrated in the drawing.

The embodiments of the invention in which a particular property or privilege is claimed are defined as follows:

1. A swing-away bunk for automotive truck cabs of the type having a driving compartment and a sleeping compartment, comprising:

a sleeping compartment having a rear wall and forward vertical supports, a bunk having a frame assembly and a mattress secured to said frame assembly, said frame assembly including a forward frame member, a rearward frame member and a cam follower on the rearward frame member, each of said rear wall and forward vertical supports having support brackets provided with horizontal ledges for supporting the forward and rearward frame members when the bunk is in a horizontal condition, link means pivotally mounting the frame assembly to the rear wall, handle means on the frame assembly forward frame member for pulling the bunk forwardly, and cam means on the rear wall aligned with the cam follower, said cam means having forwardly and upwardly directed cam surfaces for guiding the frame assembly rearward frame member past said rear wall support brackets as the bunk is pulled sharply forward into the horizontal position.

2. The bunk of claim 1, said link means including upper links pivotally connected to the rear wall above the rear support brackets, lower links pivotally mounted to said frame assembly and to said upper links, stop means for preventing the upper and lower links from passing over center whereby the links form a solid link pivot arm when pulling the bunk forward and upward from its horizontal position to cause forward movement of the cam follower so as to pass below the rear support brackets and down said cam surfaces.

3. The bunk of claim 2, said forward frame of the frame assembly including tapered pins, said forward support brackets including resilient grommets frictionally engaging said pins for resisting lateral movement of the bunk in its horizontal position.

4. The bunk of claim 1, including retractable safety belts passing from above and below the bunk through the handle means and releasibly attaching for restraining forward movement of an occupant of the bunk when in a horizontal position.

5. A swing-away bunk for a truck cab, comprising:

a frame assembly, having a fore and aft midpoint when in a horizontal position, a mattress secured to the frame assembly, means releasibly supporting the frame assembly in an open horizontal position within the cab with the mattress exposed for use, and means pivotally mounting the frame assembly approximately at said fore and aft midpoint for movement between a fully stored vertical position with said fore and aft midpoint lying below its position when the frame assembly is in said open horizontal position and the mattress is in such fully stored vertical position lying against the cab rear wall.

6. The bunk of claim 5, said pivotal mounting means including link means pivotally coupled to the fore and aft midpoints of the frame assembly and at points on the cab rear wall above the fore and aft midpoints of the horizontal position of the frame assembly, and cam means for guiding the rearward portion of the frame assembly forwardly and upwardly as the frame assembly is pulled forward so that the rear portion of the frame assembly clears the releasibly supporting means and then swings rearwardly and downwardly into the vertical position.

* * * * *